United States Patent
Bishara et al.

(10) Patent No.: US 8,305,878 B1
(45) Date of Patent: *Nov. 6, 2012

(54) FAST FAILOVER RECOVERY FOR STACKABLE NETWORK SWITCHES

(75) Inventors: Nafea Bishara, San Jose, CA (US);
Tsahi Daniel, Tel-Aviv (IL); Amit Avivi, Kfar-Saba (IL)

(73) Assignees: Marvell Israel (M.I.S.L.) Ltd., Yorkneam (IL); Marvell International Ltd., Hamilton (BM)

( * ) Notice: Subject to any disclaimer, the term of this patent is extended or adjusted under 35 U.S.C. 154(b) by 301 days.

This patent is subject to a terminal disclaimer.

(21) Appl. No.: 12/830,649

(22) Filed: Jul. 6, 2010

Related U.S. Application Data

(63) Continuation of application No. 11/900,728, filed on Sep. 13, 2007, now Pat. No. 7,756,015.

(60) Provisional application No. 60/825,523, filed on Sep. 13, 2006.

(51) Int. Cl.
*G01R 31/08* (2006.01)
*G06F 11/00* (2006.01)
*G08C 15/00* (2006.01)

(52) U.S. Cl. .................. 370/216; 370/217; 370/218

(58) Field of Classification Search .................. 370/216, 370/217, 218
See application file for complete search history.

(56) References Cited

U.S. PATENT DOCUMENTS

| | | | |
|---|---|---|---|
| 7,515,531 | B2 | 4/2009 | Sinha et al. |
| 2002/0194371 | A1 | 12/2002 | Kadoi |
| 2004/0057453 | A1 | 3/2004 | Montgomery, Jr. |
| 2006/0182135 | A1* | 8/2006 | Pisek .................. 370/406 |
| 2009/0040922 | A1 | 2/2009 | Umansky et al. |

* cited by examiner

*Primary Examiner* — Chi Pham
*Assistant Examiner* — Farah Faroul

(57) ABSTRACT

A network switch including a plurality of stack units and a plurality of links. Each of the stack units includes a port, a plurality of interfaces, and a forwarding engine in communication with the interfaces and the port. Each of the plurality of links connects one of the interfaces of one of the stack units to another one of the interfaces of another one of the stack units. When one of the links is down, a loop flag in a first packet to be transferred by a corresponding one of the interfaces of a corresponding one of the stack units over the one of the links is toggled; and the forwarding engine of the corresponding one of the stack units is configured to transfer the first packet to another one of the interfaces of the corresponding one of the stack units for transfer over a different one of the links.

18 Claims, 7 Drawing Sheets

US 8,305,878 B1

FAST FAILOVER RECOVERY FOR STACKABLE NETWORK SWITCHES

CROSS-REFERENCE TO RELATED APPLICATIONS

This application is a continuation of U.S. patent application Ser. No. 11/900,728, now U.S. Pat. No. 7,756,015, filed Sep. 13, 2007, which claims the benefit of U.S. Provisional Patent Application No. 60/825,523 filed Sep. 13, 2006, the disclosures thereof incorporated by reference herein in their entirety.

BACKGROUND

The present invention relates generally to data communications. More particularly, the present invention relates to fast failover recovery for stackable network switches.

A stackable network switch comprises a plurality of stack units. Like regular network switches, each stack unit comprises ports, a forwarding engine, and a control plane processor. But each stack unit also includes one or more stacking interfaces for interconnecting the stack units via stacking links to form the stackable network switch, which acts as a single large switch.

Occasionally one of the stacking links will fail. Conventional failover solutions require the control plane processors to reconfigure the stacking interfaces to route traffic around the failed stacking link, and to reconfigure the original paths once the failed stacking link is restored. But because the control plane processors are involved, these failover solutions incur long system down times for the stackable network switch.

SUMMARY

In general, in one aspect, the invention features a stack unit for a stackable network switch, the stack unit comprising: a network port to exchange packets with a network; two stacking interfaces each to exchange the packets over a respective stacking link with another stack unit, wherein each stacking interface is assigned to the other stacking interface as an alternate stacking interface; and a forwarding engine to transfer the packets among the stacking interfaces and network port; wherein when one of the stacking links is down, the respective stacking interface toggles a loop flag in each packet received from the forwarding engine, and returns each received packet to the forwarding engine; and wherein the forwarding engine transfers each packet received from one of the stacking interfaces to the respective alternate stacking interface when the loop flag for the packet is set.

In some embodiments, each stacking interface comprises a failure detect unit to detect failure of the respective stacking link. In some embodiments, the forwarding engine transfers a packet to the network port only when the loop flag for the packet is not set. In some embodiments, the stack unit has a device identifier; wherein the stack unit adds the device identifier as a source device identifier, and adds a device identifier of another stack unit as a target device identifier, to each packet received from the network by the stack unit; and wherein the forwarding engine transfers a packet to the network port only when the loop flag for the packet is not set, or when the packet is a unicast packet and the target device identifier of the packet is the device identifier of the stack unit. In some embodiments, the stack unit has a device identifier; wherein the stack unit adds the device identifier as a source device identifier to each packet received from the network by the stack unit; wherein the forwarding engine sets a drop-on-source flag in each packet received from one of the stacking interfaces when the loop flag for the packet is set and the source device identifier of the packet is the device identifier for the stack unit; and wherein the forwarding engine drops a packet received by the forwarding engine when the loop flag for the packet is set, the drop-on-source flag for the packet is set, and the source device identifier of the packet is the device identifier for the stack unit. In some embodiments, the stacking links connect the stack unit to another stack unit in a dual ring topology. Some embodiments comprise a stackable network switch incorporating the stack unit.

In general, in one aspect, the invention features a method for operating a stack unit, the method comprising: exchanging packets with a network; exchanging the packets through two stacking interfaces of the stack unit over respective stacking links with another stack unit, wherein each stacking interface is assigned to the other stacking interface as an alternate stacking interface; and when one of the stacking links is down, toggling a loop flag in a packet received by the respective stacking interface, and transferring the packet to the respective alternate stacking interface.

Some embodiments comprise detecting failure amongst the stacking links. Some embodiments comprise transferring a packet to the network only when the loop flag for the packet is not set. In some embodiments, the stack unit has a device identifier, the method further comprising: adding the device identifier of the stack unit as a source device identifier to a packet received from the network by the stack unit; adding a device identifier of another stack unit as a target device identifier to the packet; and transferring a packet to the network port only when the loop flag for the packet is not set, or when the packet is a unicast packet and the target device identifier of the packet is the device identifier of the stack unit. In some embodiments, the stack unit has a device identifier; and wherein the stack unit adds the device identifier as a source device identifier to a packet received from the network by the stack unit; the method further comprising setting a drop-on-source flag in a packet received from another stack unit when the loop flag for the packet is set and the source device identifier of the packet is the device identifier for the stack unit, and dropping a packet when the loop flag for the packet is set, the drop-on-source flag for the packet is set, and the source device identifier of the packet is the device identifier for the stack unit. In some embodiments, the stacking links connect the stack unit to another stack unit in a dual ring topology.

In general, in one aspect, the invention features a stack unit for a stackable network switch, the stack unit comprising: network port means for exchanging packets with a network; two stacking interface means each for exchanging the packets over a respective stacking link with another stack unit, wherein each stacking interface means is assigned to the other stacking interface means as an alternate stacking interface means; and forwarding engine means for transferring the packets among the stacking interface means and network port means; wherein when one of the stacking links is down, the respective stacking interface means toggles a loop flag in each packet received from the forwarding engine means, and returns each received packet to the forwarding engine means; and wherein the forwarding engine means transfers each packet received from one of the stacking interface means to the respective alternate stacking interface means when the loop flag for the packet is set.

In some embodiments, each stacking interface means comprises failure detect means for detecting failure of the respective stacking link. In some embodiments, the forwarding engine means transfers a packet to the network port means only when the loop flag for the packet is not set. In some embodiments, the stack unit has a device identifier; wherein the stack unit adds the device identifier as a source device identifier, and adds a device identifier of another stack unit as a target device identifier, to each packet received from the network by the stack unit; and wherein the forwarding engine means transfers a packet to the network port means only when the loop flag for the packet is not set, or when the packet is a unicast packet and the target device identifier of the packet is the device identifier of the stack unit. In some embodiments, the stack unit has a device identifier; wherein the stack unit adds the device identifier as a source device identifier to each packet received from the network by the stack unit; wherein the forwarding engine means sets a drop-on-source flag in each packet received from one of the stacking interface means when the loop flag for the packet is set and the source device identifier of the packet is the device identifier for the stack unit; and wherein the forwarding engine means drops a packet received by the forwarding engine means when the loop flag for the packet is set, the drop-on-source flag for the packet is set, and the source device identifier of the packet is the device identifier for the stack unit. In some embodiments, the stacking links connect the stack unit to another stack unit in a dual ring topology. Some embodiments comprise a stackable network switch incorporating the stack unit.

In general, in one aspect, the invention features a computer program executable on a processor, comprising: instructions for exchanging packets with a network; instructions for exchanging the packets through two stacking interfaces of the stack unit over respective stacking links with another stack unit, wherein each stacking interface is assigned to the other stacking interface as an alternate stacking interface; and instructions for, when one of the stacking links is down, toggling a loop flag in a packet received by the respective stacking interface, and transferring the packet to the respective alternate stacking interface.

Some embodiments comprise instructions for detecting failure amongst the stacking links. Some embodiments comprise instructions for transferring a packet to the network only when the loop flag for the packet is not set. In some embodiments, the stack unit has a device identifier, the computer program further comprising: instructions for adding the device identifier of the stack unit as a source device identifier to a packet received from the network by the stack unit; instructions for adding a device identifier of another stack unit as a target device identifier to the packet; and instructions for transferring a packet to the network port only when the loop flag for the packet is not set, or when the packet is a unicast packet and the target device identifier of the packet is the device identifier of the stack unit. In some embodiments, the stack unit has a device identifier; and wherein the stack unit adds the device identifier as a source device identifier to a packet received from the network by the stack unit; the computer program further comprising instructions for setting a drop-on-source flag in a packet received from another stack unit when the loop flag for the packet is set and the source device identifier of the packet is the device identifier for the stack unit, and instructions for dropping a packet when the loop flag for the packet is set, the drop-on-source flag for the packet is set, and the source device identifier of the packet is the device identifier for the stack unit. In some embodiments, the stacking links connect the stack unit to another stack unit in a dual ring topology.

The details of one or more implementations are set forth in the accompanying drawings and the description below. Other features will be apparent from the description and drawings, and from the claims.

Figure 1:
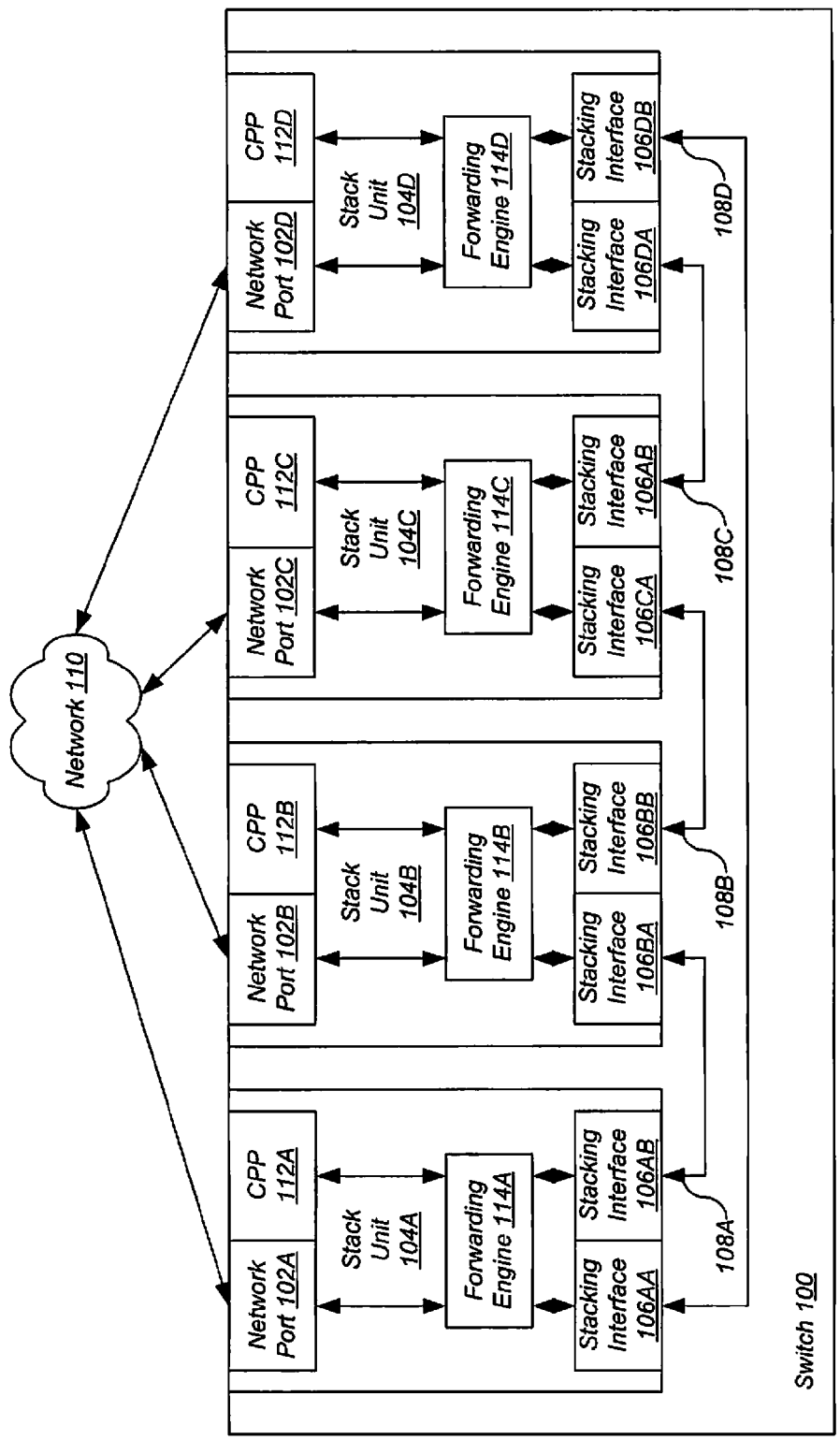
FIG. 1 shows a stackable network switch connected to a network according to some embodiments of the present invention.

The leading digit(s) of each reference numeral used in this specification indicates the number of the drawing in which the reference numeral first appears.

DETAILED DESCRIPTION

Embodiments of the present invention provide fast failover recovery for stackable network switches. FIG. 1 shows a stackable network switch 100 connected to a network 110 according to some embodiments of the present invention. Although in the described embodiments the elements of stackable network switch 100 are presented in one arrangement, other embodiments may feature other arrangements, as will be apparent to one skilled in the relevant arts based on the disclosure and teachings provided herein. For example, the elements of stackable network switch 100 can be implemented in hardware, software, or combinations thereof. In addition, while described with respect to a stackable network switch, embodiments of the present invention are applicable to other environments.

Stackable network switch 100 comprises four stack units 104A-D. Within stackable network switch 100, stack units 104 are interconnected in a dual ring topology, although other topologies are possible. Each stack unit 104 comprises one or more network ports 102, a forwarding engine 114, and a control plane processor (CPP) 112. But each stack unit 104 also includes one or more stacking interfaces 106 for interconnecting a plurality of the stack units 104 via stacking links 108 to form stackable network switch 100. One of the stack units 104 is generally configured as the master stack unit. Stackable network switch 100 then performs as a single large switch, with the control plane processor 112 of the master stack unit 104 acting as the control plane processor 112 for the entire stackable network switch 100.

While embodiments of the present invention are described with respect to a stackable network switch 100 comprising four stack units 104, these embodiments are easily extended to include larger numbers of stack units 104 interconnected in dual-ring and other network topologies, as will be apparent to one skilled in the relevant arts after reading this description.

Figure 2:
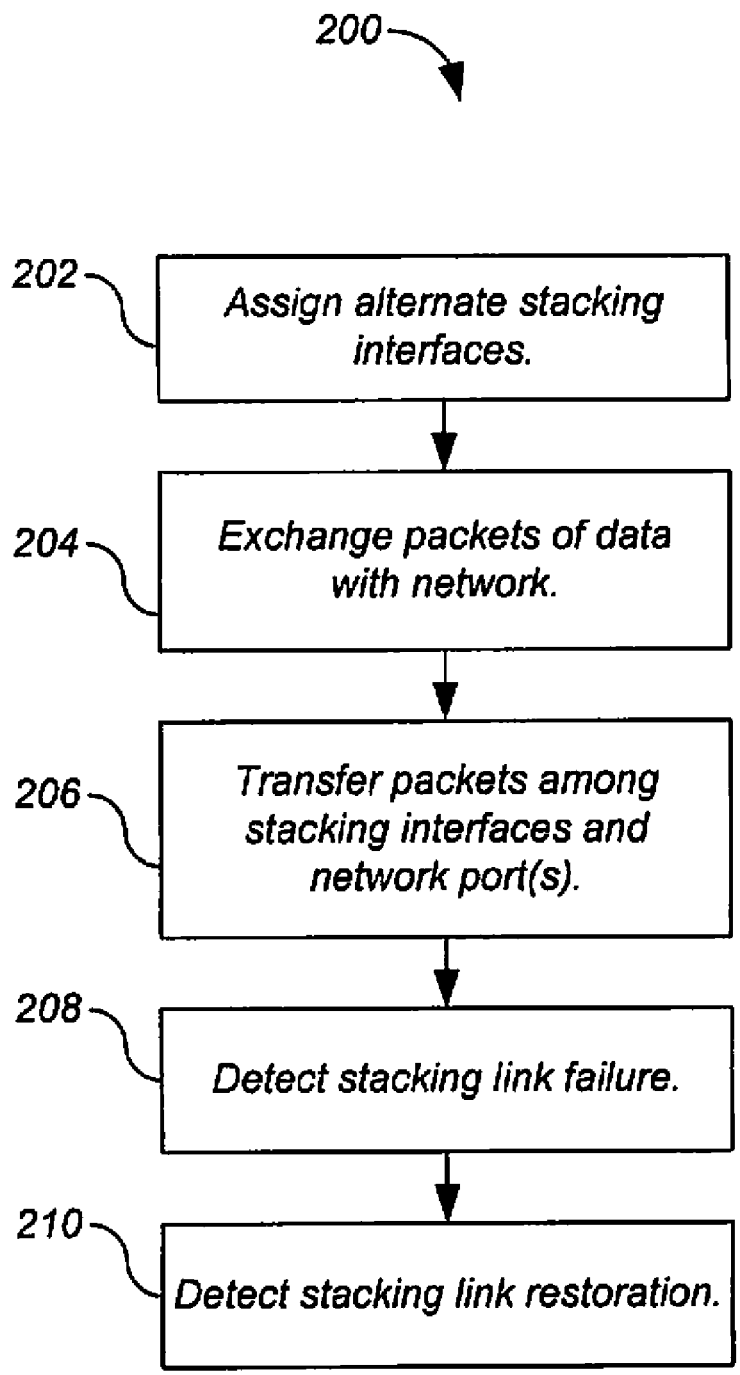
FIG. 2 shows a process for the stackable network switch of FIG. 1 according to some embodiments of the present invention.

FIG. 2 shows a process 200 for stackable network switch 100 of FIG. 1 according to some embodiments of the present invention. Although in the described embodiments the elements of process 200 are presented in one arrangement, other embodiments may feature other arrangements, as will be apparent to one skilled in the relevant arts based on the disclosure and teachings provided herein. For example, some or all of the steps of process 200 can occur concurrently, in a different order, and the like.

Occasionally a stacking link 108 will fail. Therefore, each stacking interface 106 in each stack unit 104 is assigned an alternate stacking interface 106 in that stack unit 104 (step 202). This assignment process can take place during configuration of stack units 104. For example, in the dual-ring topology of FIG. 1, in stack unit 104B, stacking interface 106BB is assigned as the alternate stacking interface 106 for stacking interface 106BA, and stacking interface 106BA is assigned as the alternate stacking interface 106 for stacking interface 106BB.

Network ports 102 exchange packets of data with network 110 (step 204). Within each stack unit 104, the respective forwarding engine 114 transfers the packets among stacking interfaces 106 and network port(s) 102 (step 206). When a packet ingressed by a network port 102 of one stack unit 104 should be egressed by a network port 102 of another stack unit 104, the packet is transferred between the stack units 104 over one or more stacking interfaces 106 and stacking links 108.

Referring again to FIG. 2, when a stacking link 108 fails, the failure is detected by the respective stacking interfaces 106 (step 208). Similarly, when a failed stacking link 108 is restored, the restoration is detected by the respective stacking interfaces 106 (step 210). Each stacking interface 106 can include a link monitor unit to automatically detect failure and restoration of the respective stacking link 108. For example, referring again to FIG. 1, when stacking link 108B fails (or is restored), the failure (or is restoration) is detected by stacking interface 106BB in stack unit 104B, and by stacking interface 106CA in stack unit 104C.

Figure 3:
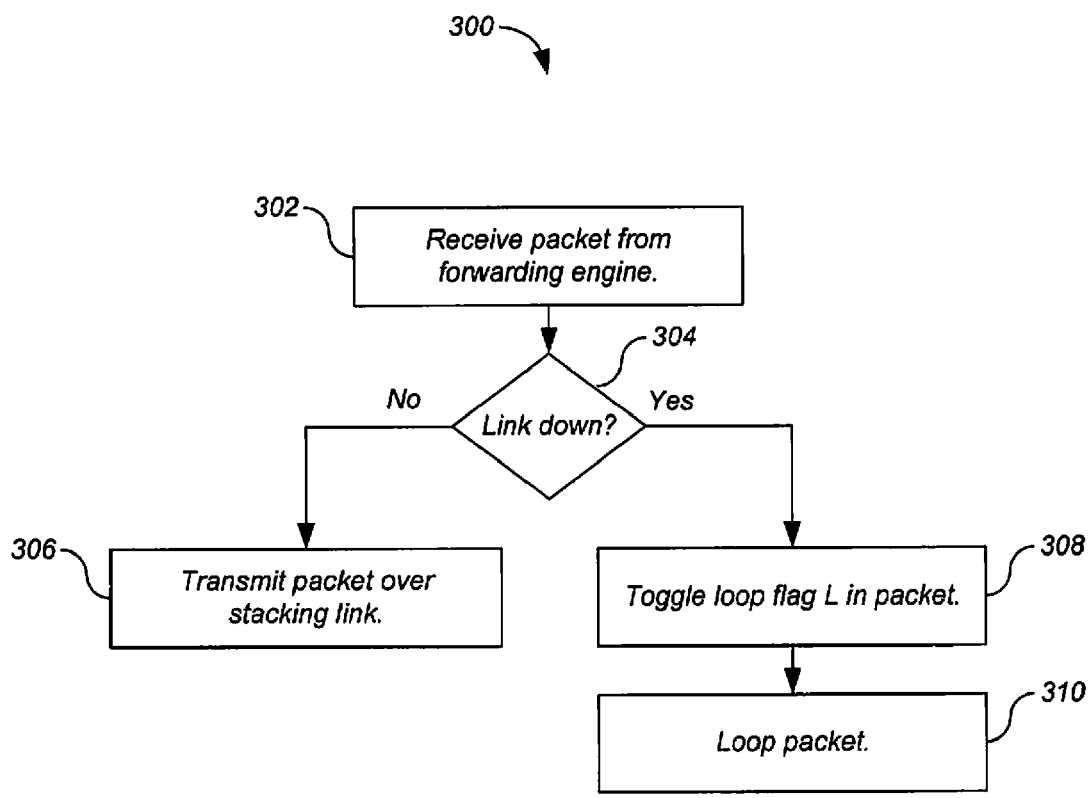
FIG. 3 shows a process for a stacking interface of the stackable network switch of FIG. 1 according to some embodiments of the present invention.

FIG. 3 shows a process 300 for a stacking interface 106 of stackable network switch 100 of FIG. 1 according to some embodiments of the present invention. Although in the described embodiments the elements of process 300 are presented in one arrangement, other embodiments may feature other arrangements, as will be apparent to one skilled in the relevant arts based on the disclosure and teachings provided herein. For example, some or all of the steps of process 300 can occur concurrently, in a different order, and the like.

Process 300 begins when the stacking interface 106 in a stack unit 104 receives a packet from the forwarding engine in that stack unit 104 (step 302). If the respective stacking link 108 is up (that is, the stacking link 108 has not failed or has failed but has been restored—step 304), stacking interface 106 transmits the packet over that stacking link 108 (step 306).

But when the stacking link 108 is down (that is, the stacking link 108 has failed but has not been restored), the respective stacking interface 106 toggles a loop flag L in the packet (step 308), and loops the packet (that is, the stacking interface 106 returns the packet to the respective forwarding engine 114—step 310). For example, referring again to FIG. 1, when stacking link 108B is down, stacking interface 106BB toggles a loop flag L in each packet received from forwarding engine 114B, and returns the packet to forwarding engine 114B. Similarly, stacking interface 106CA toggles a loop flag L in each packet received from forwarding engine 114C, and returns the packet to forwarding engine 114C. Alternatively, the control plane processor 112 of the stack unit 104 can configure the respective stacking interface 106 to a loop state in response to the link failure, and if needed, can force the stacking link 108 to an up state.

Toggling a flag means changing the state of the flag. That is, when the loop flag L is clear (L=0), toggling the loop flag L sets the loop flag L (L=1), and when the loop flag L is set (L=1), toggling the loop flag L clears the loop flag L (L=0). The loop flag L can be part of the packet header, can be part of a packet tag added to the packet, and the like. Each forwarding engine 114 transfers a packet to the respective network port(s) 102 only when the loop flag L for the packet is not set (L=0) or when the packet is a unicast packet and the respective stack unit 104 is the target device of the packet (that is, the target device identifier of the packet is the device identifier of that stack unit 104).

Figure 4:
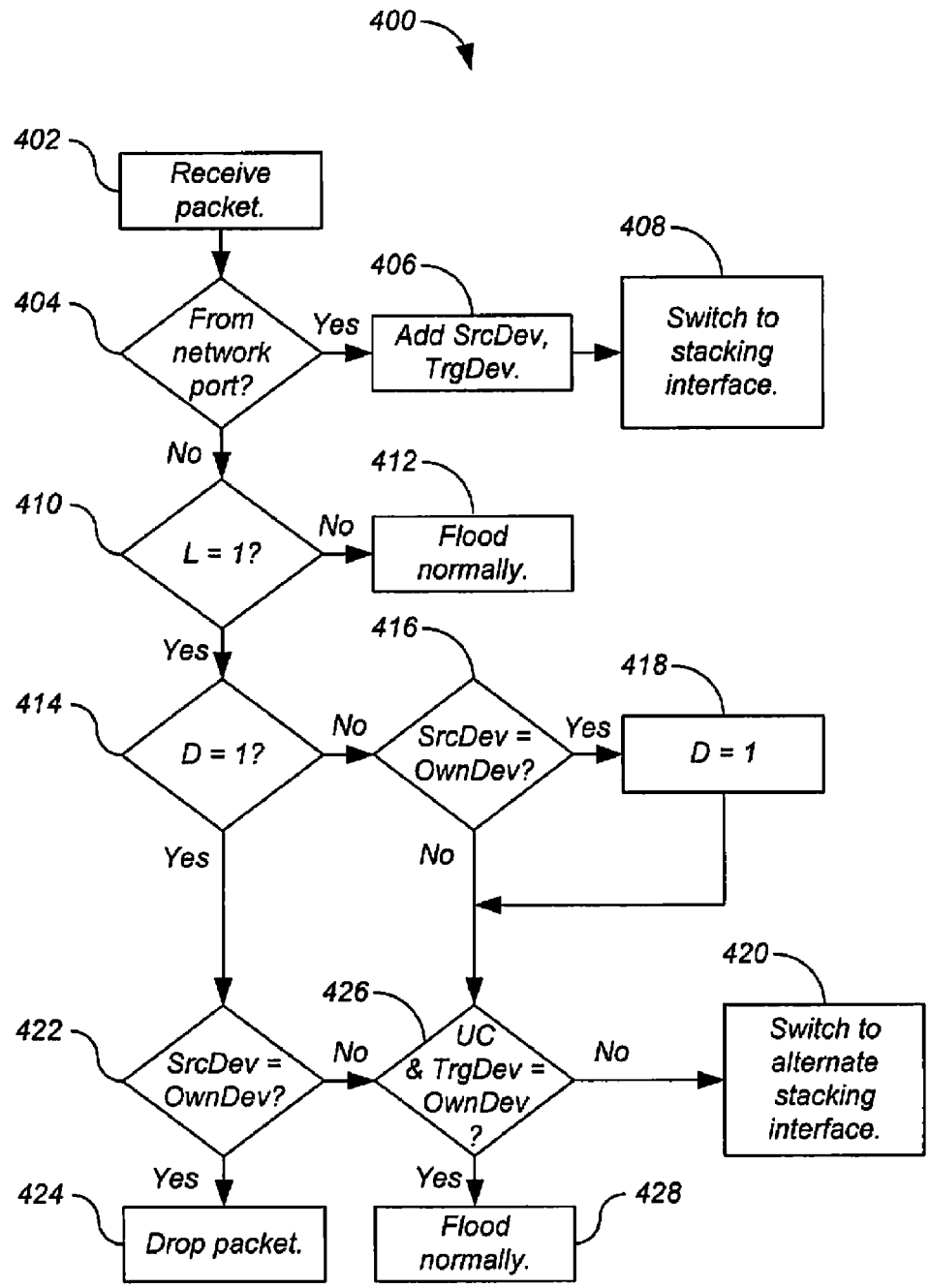
FIG. 4 shows a process for the forwarding engine of the stackable network switch of FIG. 1 according to some embodiments of the present invention.

FIG. 4 shows a process 400 for forwarding engine 114 of stackable network switch 100 of FIG. 1 according to some embodiments of the present invention. Although in the described embodiments the elements of process 400 are presented in one arrangement, other embodiments may feature other arrangements, as will be apparent to one skilled in the relevant arts based on the disclosure and teachings provided herein. For example, some or all of the steps of process 400 can occur concurrently, in a different order, and the like.

Process 400 begins when forwarding engine 114 receives a packet (step 402). If the packet is received from a network port 102 (step 404), forwarding engine 114 adds a source device identifier (SrcDev) and a target device identifier (TrgDev) to the packet (step 406), and switches the packet to one of the stacking interfaces 106 in the stack unit 104 (step 408).

The identifiers SrcDev and TrgDev can be part of the packet header, can be part of a packet tag added to the packet, and the like. Each stack unit 104 has a device identifier that is unique within stackable network switch 100. Identifier SrcDev identifies the stack unit 104 that ingressed the packet from network 110, and identifier TrgDev identifies the stack unit 104 that should egress the packet to network 110. Based on the disclosure and teachings provided herein, the identifiers SrcDev and TrgDev can be determined.

However, if forwarding engine 114 did not receive the packet from a network port 102 (step 404), meaning that forwarding engine 114 received the packet from a stacking interface 106, forwarding engine 114 determines whether the loop flag L is set in the packet (step 410). If the loop flag L is not set, forwarding engine 114 switches the packet normally (step 412).

However, if loop flag L is set in the packet (step 410), forwarding engine 114 determines whether a drop-on-source flag D is set in the packet (step 414). The drop-on-source flag D can be part of the packet header, can be part of a packet tag added to the packet, and the like. The use of drop-on-source flag D prevents a looped packet from endlessly cycling through stackable network switch 100, as described below.

If drop-on-source flag D is set in the packet (step 410), forwarding engine 114 checks the source device identifier SrcDev of the packet to determine whether the respective stack unit 104 is the source of the packet (step 422). If yes, then the packet has looped back to the source stack unit 104 (that is, the stack unit 104 that ingressed the packet), and is therefore dropped (step 424). If no, then forwarding engine 114 switches the packet to the alternate stacking interface 106 (step 420).

In some embodiments, a refinement is added to process 400 for unicast packets. If the packet is a unicast (UC) packet, and the respective stack unit 104 is the target device of the packet (step 426), then the packet is flooded normally (that is, the packet is switched to the appropriate network port 102 of that stack unit 104—step 428). For example, referring again to FIG. 1, if the packet was received by forwarding engine 114B from stacking interface 106BA, forwarding engine 114B switches the packet to network port 102B. Otherwise, forwarding engine 114 then switches the packet to the alternate stacking interface 106 (step 420). For example, referring again to FIG. 1, if the packet was received by forwarding engine 114B from stacking interface 106BA, forwarding engine 114B switches the packet to stacking interface 106BB.

However, if at step 414 the drop-on-source flag D is not set (D=0), forwarding engine 114 checks the source device identifier SrcDev of the packet to determine whether the respective stack unit 104 is the source of the packet (step 416). If yes, then forwarding engine 114 sets the drop-on-source flag D (D=1) in the packet (step 418). In either case, process 400 then continues at step 426.

Figure 5:
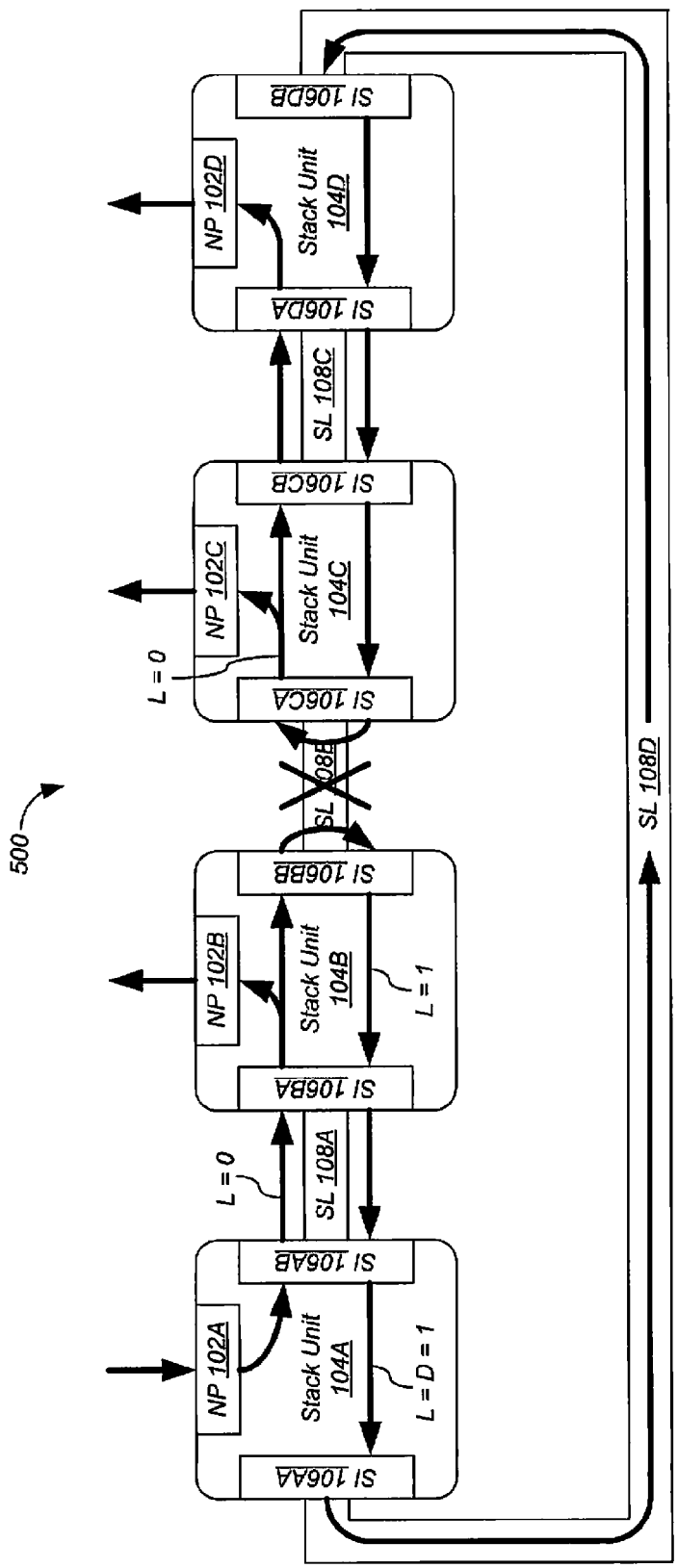
FIG. 5 shows an example process of the stackable network switch of FIG. 1 for a multicast packet according to some embodiments of the present invention.

FIG. 5 shows an example process 500 of stackable network switch 100 for a multicast packet according to some embodiments of the present invention. Broadcast packets are handled in a similar manner. For clarity, only the stack units 104, stacking interfaces (SI) 106, stacking links (SL) 108, and network ports (NP) 102 are shown. Referring to FIG. 5, process 500 begins when stacking link 108B fails.

Stack unit 104A ingresses a multicast packet on network port 102A, and adds source and target device identifiers to the packet. The source device identifier identifies stack unit 104A. Because the packet is multicast, the target device identifier can take the form of a multicast group number. Stack unit 104A also initializes the value of loop flag L to clear (L=0) in the packet. Stack unit 104A switches the packet to stacking interface 106AB. The packet traverses stacking link 108A, and enters stack unit 104B on stacking interface 106BA. The packet path is shown as bold arrows in FIG. 5.

Stack unit 104B switches the multicast packet to both network port 102B and stacking interface 106BB. However, because stacking link 108B is down, stacking interface 106BB loops the packet, and toggles the loop flag L for the packet. Loop flag L was initialized to L=0 by stack unit 104A, so the value of loop flag L after toggling is L=1.

Forwarding engine 114B (not shown in FIG. 5) of stack unit 104B receives the looped packet, and because the loop flag L of the packet is set (L=1), switches the packet to the alternate stacking interface 106BA, which passes the packet to stack unit 104A over stacking link 108A.

Because loop flag L is set (L=1), and stack unit 104A is the source of the packet, stack unit 104A sets the drop-on-source flag for the packet (D=1), and switches the packet to the alternate stacking interface 106AA, which passes the packet to stack unit 104D over stacking link 108D. The packet is passed in similar fashion to stack unit 104C, which switches the packet to stacking interface 106CA.

However, because stacking link 108B is down, stacking interface 106CA loops the packet, and toggles the loop flag L for the packet, which clears the flag (L=j). Forwarding engine 114C (not shown in FIG. 5) of stack unit 104C receives the looped packet, and because the loop flag L of the packet is clear (L=0), switches the multicast packet to both network port 102C and stacking interface 106CB. Stack unit 104D receives the packet, and switches the packet to network port 102D. Note that, although the drop-on-source flag D for the packet is set (D=1), the packet was not received by the source device (stack unit 104A) with D=1, so the packet was not dropped.

Figure 6:
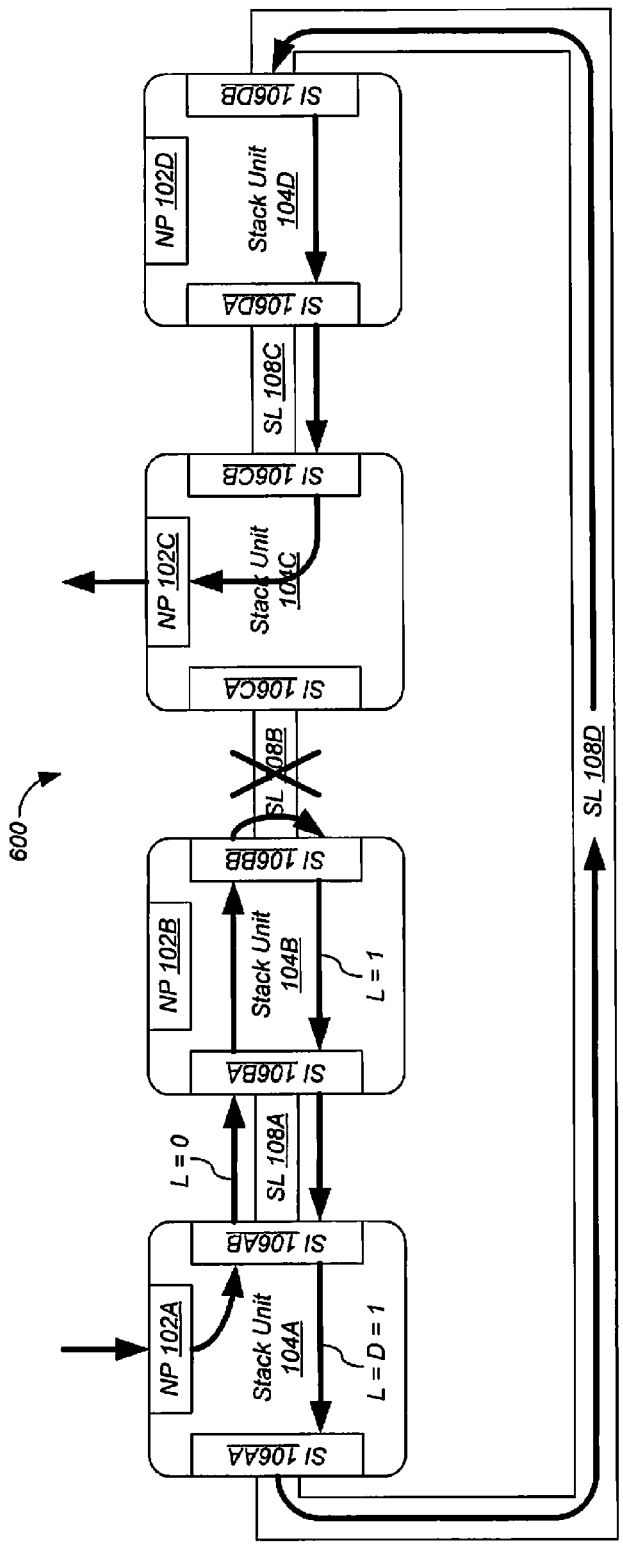
FIG. 6 shows an example process of the stackable network switch of FIG. 1 for a unicast packet according to some embodiments of the present invention.

FIG. 6 shows an example process 600 of stackable network switch 100 for a unicast packet according to some embodiments of the present invention. For clarity, only the stack units 104, stacking interfaces (SI) 106, stacking links (SL) 108, and network ports (NP) 102 are shown. Referring to FIG. 6, process 600 begins when stacking link 108B fails.

Stack unit 104A receives a unicast packet on network port 102A, and adds source and target device identifiers to the packet. The source device identifier identifies stack unit 104A. The target device identifier identifies stack unit 104C. Stack unit 104A also initializes the value of loop flag L to clear (L=0) in the packet. Stack unit 104A switches the packet to stacking interface 106AB. The packet traverses stacking link 108A, and enters stack unit 104B on stacking interface 106BA. The packet path is shown as bold arrows in FIG. 6.

Stack unit 104B switches the packet to stacking interface 106BB. However, because stacking link 108B is down, stacking interface 106BB loops the packet, and toggles the loop flag L for the packet. Loop flag L was initialized to L=0 by stack unit 104A, so the value of loop flag L after toggling is L=1.

Forwarding engine 114B (not shown in FIG. 6) of stack unit 104B receives the looped packet, and because the loop flag L of the packet is set (L=1), switches the packet to the alternate stacking interface 106BA, which passes the packet to stack unit 104A over stacking link 108A.

Because loop flag L is set (L=1), and stack unit 104A is the source of the packet, stack unit 104A sets the drop-on-source flag for the packet (D=1), and switches the packet to the alternate stacking interface 106AA, which passes the packet to stack unit 104D over stacking link 108D. The packet is passed in similar fashion to stack unit 104C.

Because the packet is a unicast packet that has reached its target device, forwarding engine 114C of stack unit 104C switches the packet to network port 102C, where the packet egresses stackable network switch 100. In other embodiments, the packet can be looped through stacking interface 106CA before egress, as with multicast and broadcast packets. Note that, although the drop-on-source flag D for the packet is set (D=1), the packet was not received by the source device (stack unit 104A) with D=1, so the packet was not dropped.

Figure 7:
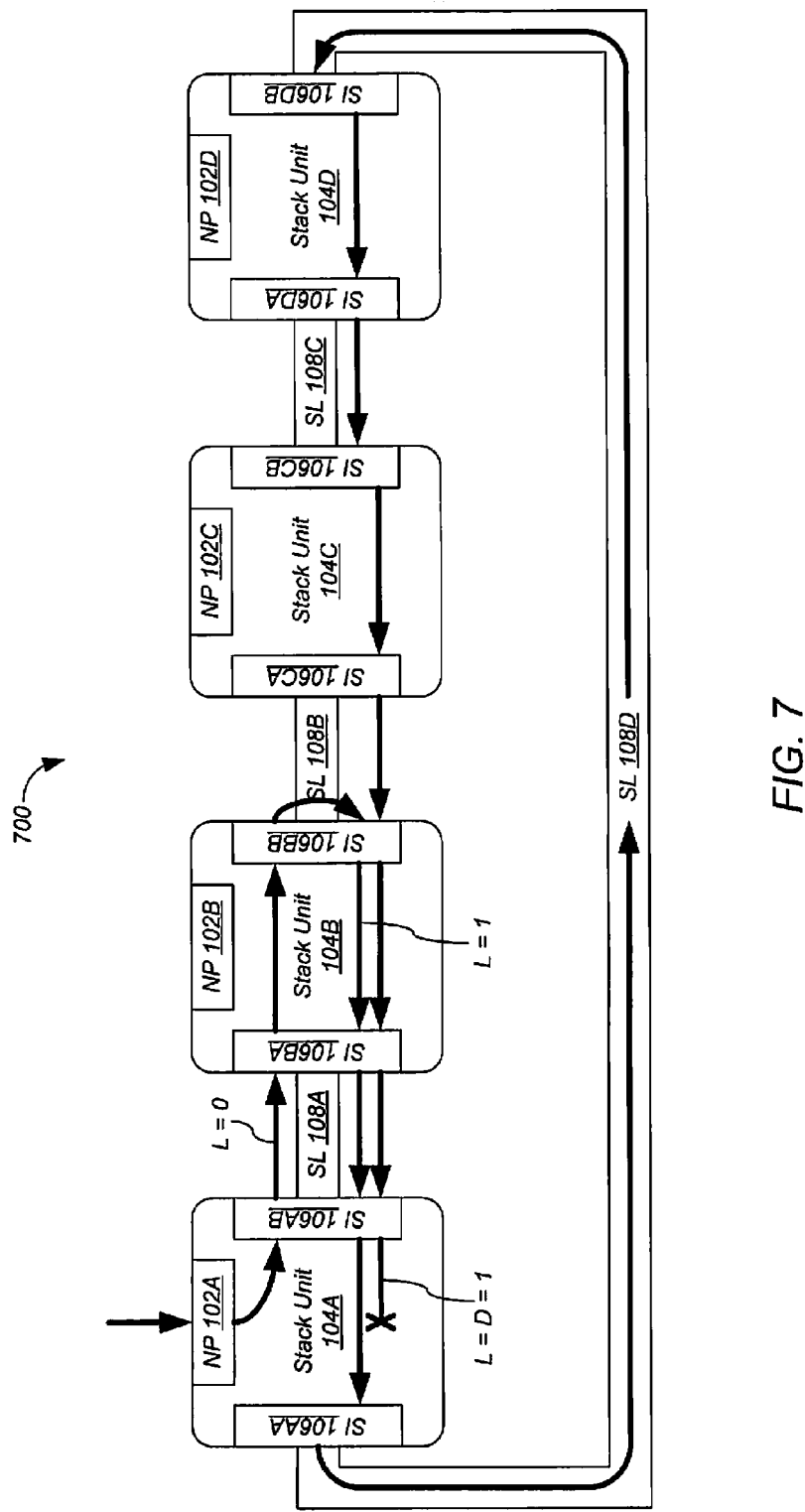
FIG. 7 shows an example failover recovery process of the stackable network switch of FIG. 1 according to some embodiments of the present invention.

FIG. 7 shows an example failover recovery process 700 of stackable network switch 100 according to some embodiments of the present invention. For clarity, only the stack units 104, stacking interfaces (SI) 106, stacking links (SL) 108, and network ports (NP) 102 are shown. Referring to FIG. 7, process 700 begins when stacking link 108B fails.

Stack unit 104A receives a packet on network port 102A, and adds source and target device identifiers to the packet. The source device identifier identifies stack unit 104A. The target device identifier identifies stack unit 104C. Stack unit 104A also initializes the value of loop flag L to clear (L=0) in the packet. Stack unit 104A switches the packet to stacking interface 106AB. The packet traverses stacking link 108A, and enters stack unit 104B on stacking interface 106BA. The packet path is shown as bold arrows in FIG. 7.

Stack unit 104B switches the packet to stacking interface 106BB. However, because stacking link 108B is down, stacking interface 106BB loops the packet, and toggles the loop flag L for the packet. Loop flag L was initialized to L=0 by stack unit 104A, so the value of loop flag L after toggling is L=1.

Forwarding engine 114B (not shown in FIG. 7) of stack unit 104B receives the looped packet, and because the loop flag L of the packet is set (L=1), switches the packet to the alternate stacking interface 106BA, which passes the packet to stack unit 104A over stacking link 108A.

Because loop flag L is set (L=1), and stack unit 104A is the source of the packet, stack unit 104A sets the drop-on-source flag for the packet (D=1), and switches the packet to the alternate stacking interface 106AA, which passes the packet to stack unit 104D over stacking link 108D. The packet is passed in similar fashion to stack unit 104C.

Forwarding engine 114C (not shown in FIG. 7) of stack unit 104C switches the packet to stacking interface 106CA. By this point, stacking link 108B has been restored, so instead of looping the packet and toggling loop flag L for the packet, stacking interface 106CA passes the packet over stacking link 108B to stack unit 104B.

Because the loop flag L is still set (L=1), the packet would loop endlessly through stackable network switch 100 but for the use of the drop-on-source flag D, which is currently set (D=1). When the packet reaches stack unit 104A, forwarding engine 114 (not shown in FIG. 7) drops the packet because the loop and drop-on-source flags are both set (L=D=1), and the packet has reach its source device.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network switch, comprising:
  a plurality of stack units, wherein each of the stack units comprises:
    a port;
    a plurality of interfaces; and
    a forwarding engine in communication with the interfaces and the port; and a plurality of links, wherein each of the links connects one of the interfaces of one of the stack units to one of the interfaces of another one of the stack units, wherein when one of the links is down,
  a loop flag in a first packet to be transferred by a corresponding one of the interfaces of a corresponding one of the stack units over the one of the links is toggled, and
  the forwarding engine of the corresponding one of the stack units is configured to transfer the first packet to another one of the interfaces of the corresponding one of the stack units for transfer over a different one of the links.

2. The network switch of claim 1, wherein each of the interfaces comprises a failure detect unit configured to detect failure of a respective one of the links.

3. The network switch of claim 1, wherein the forwarding engine of the one of the stack units is configured to transfer a second packet to the port of the one of the stack units only when the loop flag for the second packet is not set.

4. The network switch of claim 1, wherein
  each of the stack units includes a device identifier configured to add a source device identifier and a target device identifier to a second packet when the second packet is received at the port of a respective one of the stack units.

5. The network switch of claim 4, wherein the forwarding engine of the respective one of the stack units is configured to transfer the second packet to the port only when
  the loop flag for the second packet is not set, or
  the second packet is a unicast packet and the target device identifier of the second packet is the device identifier of another one of the stack units.

6. The network switch of claim 1, wherein
  each of the stack units includes a device identifier configured to add a source device identifier to a second packet received at the port of a respective one of the stack units.

7. The network switch of claim 6, wherein the forwarding engine is configured to set a drop-on-source flag in a third packet received from one of the interfaces when
  the loop flag for the third packet is set, and
  the source device identifier of the third packet is the device identifier for the respective one of the stack units.

8. The network switch of claim 7, wherein the forwarding engine is configured to drop a fourth packet received by the forwarding engine when
  the loop flag for the fourth packet is set,
  the drop-on-source flag for the fourth packet is set, and
  the source device identifier of the fourth packet is the device identifier for the respective one of the stack units.

9. The network switch of claim 1, wherein the links connect the stack units in a dual ring topology.

10. A method for operating a network switch, the method comprising:
  exchanging packets with a network via a plurality of stack units, wherein each of the stack units comprises:
    a port;
    a plurality of interfaces; and
    a forwarding engine in communication with the interfaces, and the port; and
  interconnecting the stack units using a plurality of links, wherein each of the links connects one of the interfaces of one of the stack units to one of the interfaces of another one of the stack units; and
  when one of the links is down,
    toggling a loop flag in a first packet to be transferred by a corresponding one of the interfaces of a corresponding one of the stack units over the one of the links, and in the forwarding engine of the corresponding one of the stack units, transferring the first packet to another one of the interfaces of the corresponding one of the stack units for transfer over a different one of the links.

11. The method of claim 10, further comprising detecting failure of a respective one of the links in each of the interfaces.

12. The method of claim 10, further comprising transferring a second packet to the port of the one of the stack units only when the loop flag for the second packet is not set.

13. The method of claim 10, further comprising adding a source device identifier and a target device identifier to a second packet when the second packet is received at the port of a respective one of the stack units.

14. The method of claim 13, further comprising transferring the second packet to the port only when
- the loop flag for the second packet is not set, or
- the second packet is a unicast packet and the target device identifier of the second packet is the device identifier of another one of the stack units.

15. The method of claim 10, further comprising adding a source device identifier to a second packet received at the port of a respective one of the stack units.

16. The method of claim 15, further comprising setting a drop-on-source flag in a third packet received from one of the interfaces when
- the loop flag for the third packet is set, and
- the source device identifier of the third packet is the device identifier for the respective one of the stack units.

17. The method of claim 16, further comprising dropping a fourth packet received by the forwarding engine when
- the loop flag for the fourth packet is set,
- the drop-on-source flag for the fourth packet is set, and
- the source device identifier of the fourth packet is the device identifier for the respective one of the stack units.

18. The method of claim 10, further comprising arranging the links in a dual ring topology.

* * * * *